United States Patent [19]
Hageman et al.

[11] 3,878,686
[45] Apr. 22, 1975

[54] GROUTING PROCESS

[75] Inventors: John A. Hageman, Nashville; Floyd M. Slagle, Franklin; Raymond T. Throckmorton, Jr., Nashville, all of Tenn.

[73] Assignee: Geologic Associates, Inc., Franklin, Tenn.

[22] Filed: Aug. 29, 1974

[21] Appl. No.: 501,493

Related U.S. Application Data

[63] Continuation-in-part of Ser. No. 308,595, Nov. 21, 1972, abandoned.

[52] U.S. Cl. .............................. 61/36 R; 166/295
[51] Int. Cl. ............................................. E02d 3/14
[58] Field of Search ...... 61/35, 36 R; 166/295, 282, 166/300; 260/DIG. 14; 106/287 SS

[56] References Cited
UNITED STATES PATENTS

3,379,253  4/1968  Chism .............................. 166/295
3,637,019  1/1972  Lee .................................. 166/295

*Primary Examiner*—Paul R. Gilliam
*Assistant Examiner*—Alexander Grosz
*Attorney, Agent, or Firm*—Harrington A. Lackey

[57] ABSTRACT

A grouting process for filling subterranean voids by controlled feeding and mixing foam-forming ingredients, such as isocyanates and polyols, and an expanding agent, such as compressed or liquefied fluorocarbon gases, to pre-expand the foam-forming ingredients in the vicinity of the void and form a fluid, closed-cell, froth foam material, and then discharging the fluid foam material into the void to fill the void before the foam material gels.

7 Claims, 5 Drawing Figures

GROUTING PROCESS

CROSS-REFERENCE TO RELATED APPLICATION

This is a continuation-in-part application of U.S. application Ser. No. 308,595, filed Nov. 21, 1972, for "GROUTING PROCESS," now abandoned.

BACKGROUND OF THE INVENTION

This invention relates to a grouting process, and more particularly to a method of filling subterranean voids with pre-expanded plastic foam material.

In conventional grouting processes, that is the filling of voids in subterranean earth or rock formations, usually some type of cement slurry or other type grounting material is used. The cement slurry of grouting material is satisfactory, if it can remain in the void long enough to set, and thereby seal the opening or fill the void. However, if underground water is present in the void, either in a relatively static condition, or in a state of flow, the cement slurry, as well as many other grouting materials, are either diluted to a state of ineffectiveness or washed away.

One method of sealing underground openings or earth fissures with bubble-forming materials is the treatment disclosed in the Billue U.S. Pat. No. 2,761,511, issued Sept. 4, 1956. Billue describes basically two methods of filling a void with bubble-forming material. One of these methods includes a material made of Portland cement and plaster of Paris, while the other method utilizes foam-producing resin polymers, such as polystyrene, vinyl compounds, polyesters and polyamides. However, in both methods Billue discharges all of his basic elements, including the gas-forming or bubble-forming elements into a fissure or void before the reaction of the elements is commenced. Thus, the elements are unnecessarily exposed for an excessive period of time to the subterranean physical and chemical elements, such as underground water and all of its mineral and chemical impurities, before the elements can react to set within the fissure. Such exposure is hazardous to any reaction at all, much less an adequate or complete reaction.

Another method of sealing or plugging underground voids or vugs is disclosed in the U.S. Chism Pat. No. 3,379,253, issued Apr. 23, 1968. Chism discloses the broad idea of injecting various types of solid-forming and foaming agents, such as polyurethane, into a well bore to fill the vugs in the well bore, and subsequently to drill through the solid formation to open up the sealed well bore. However, Chism does not disclose any means for controlling the flow and pressures of the various foam-forming ingredients to the areas to be sealed in the well bore. Moreover, Chism does not disclose the sealing of subterranean voids by a pre-expanded or froth foam having closedcell construction.

The U.S. Lee Pat. No. 3,637,019 issued Jan. 25, 1972, discloses a method for plugging a porous strata penetrated by a well bore, by separately feeding into a well bore to the area adjacent the voids, foam-forming ingredients for producing polyurethane. However, the foam-forming ingredients are expanded by compressed air. Although Lee suggests in column 4, lines 61 – 62, the use of "a fluorocarbon blowing agent," nevertheless neither the conditions nor the controls for incorporating a fluorocarbon blowing agent into the foam-forming ingredients is either taught or suggested.

SUMMARY OF THE INVENTION

It is therefore an object of this invention to provide a grouting process for filling the voids in subterranean rock, earth, concrete or other formations, by controlled feeding and pre-expanding the foam-forming ingredients with an expanding agent within a pre-expander chamber as near the void to be filled as possible. Thus, when the pre-expanded froth foam material is discharged toward the void, it has already reacted, and is still reacting in a fluid state, prior to gelling or setting, so that most of the bubbles are already formed and closed in the foam material prior to exposure to any subterranean water and minerals. The froth foam material is discharged in such a manner that it will substantially fill the void before it sets.

The foam-forming ingredients in this process must be discharged with sufficient force and have sufficient vapor pressure to displace any gaseous or liquid medium from the void under the conditions existing at the level or depth of the void beneath the ground surface.

Furthermore, the plastic foam-forming ingredients, particularly after they have reacted with the expanding agent to form the fluid foam material, must be sufficiently reacted to be inert to the underground water, minerals, acid or other impurities.

In the preferred form of the invention, the foamforming ingredients are a prepolymer, such as the organic or polymeric isocyanates, and polyolys, such as polyhydroxy ethers. The expanding agent is preferably compressed or liquefied fluorocarbon gas, such as dichlorodifluoromethane ("Freon"), or monochlorodifluoromethane. Under certain conditions, such as high hydrostatic head, carbon dioxide may be used as the expanding agent. These foam-forming ingredients and expanding agents, of course, form polyurethane froth foam.

The process carried out in accoreance with this invention is capable of filling voids in earth, rock or concrete materials either above or below the static ground water table, and of filling voids submerged in water, whether the water is relatively static or flowing, even at high rates of flow.

Although the ratio of the foam-forming ingredients and the expanding agents will vary for different depths of application for different hydrostatic pressures and other variable conditions, nevertheless a typical formula would include 60–55 percent organic isocyanates to 40–45 percent polyols.

This process is easily adapted for use in the grouting of subterranean voids beneath dam sites, the grouting of building foundations, the sealing of fissures in oil well or mine shafts, and the filling of voids in gravel, breccia or other formation.

DESCRIPTION OF THE PREFERRED EMBODIMENT

Figure 1:
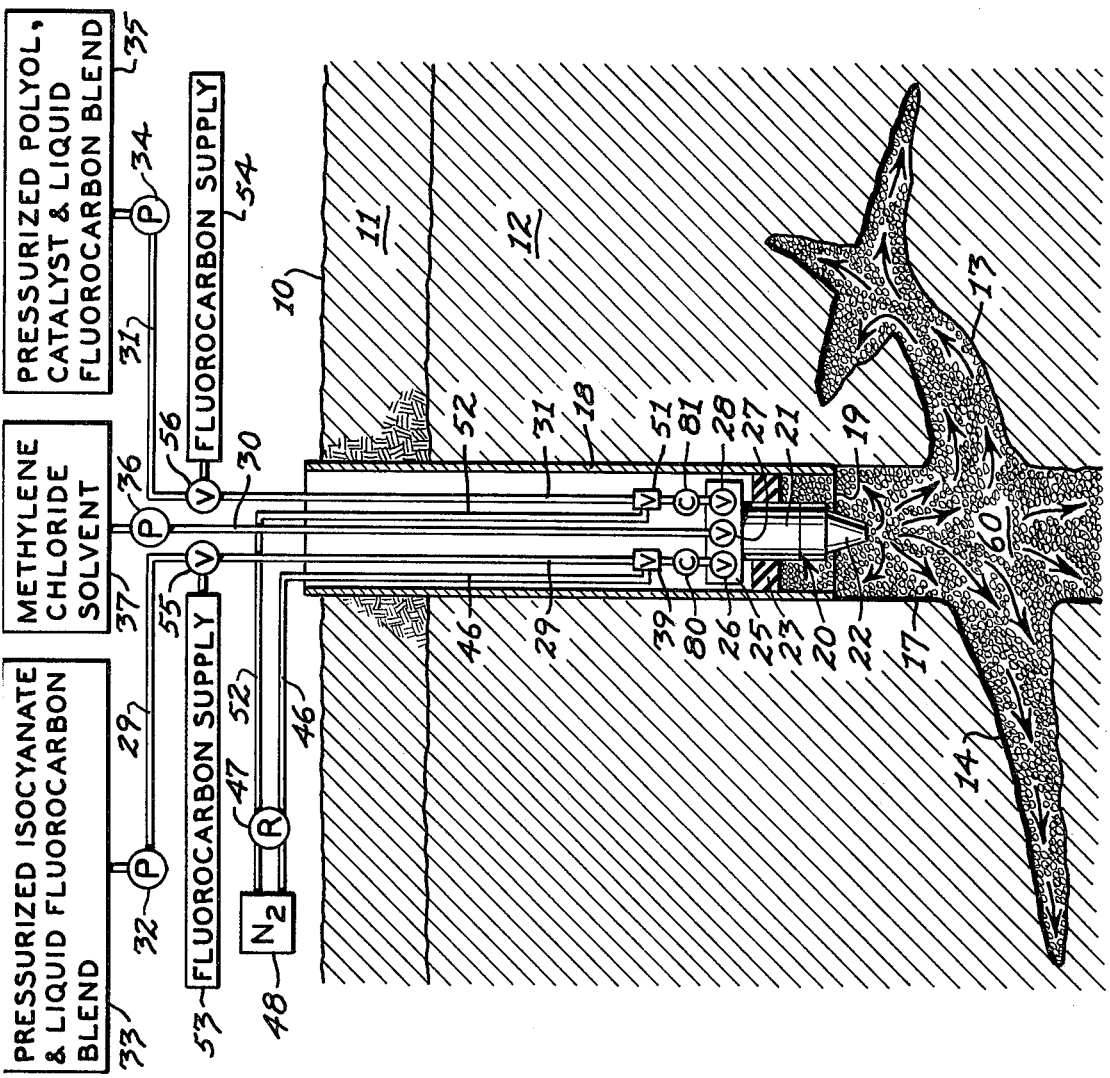
FIG. 1 is a sectional elevation of one form of ground formation, schematically illustrating the grouting method of this invention.

FIG. 1 discloses an earth formation including the ground surface 10 of a stratum of soil 11 covering a substrate of bedrock 12. The bedrock 12 includes voids such as 13 and 14.

In order to fill the voids 13 and 14 in the bedrock 12 in accordance with this method, a hole 17 must first be bored or drilled down through the surface 10, soil stratum 11 and bedrock 12, until the hole 17 is deep enough to intercept the voids 13 and 14, thereby providing fluid communication between the voids 13 and 14 and the drilled hole 17.

A well casing 18 may then be inserted into the drilled hole 17 to the desired depth, so that its bottom edge 19 is slightly above the voids 13 and 14.

A foam gun 20 having a pre-expander chamber 21 and a nozzle 22 is lowered into the drilled hole 17 so that the nozzle 22 is in the vicinity of, and substantially at the same level as, the voids to be filled, such as the voids 13 and 14. An annular packer 23 is fitted around the foam gun 20 and tightly against the casing 18, in order to seal off the bottom of the casing 18. The foam gun 20 is in fluid communication with a header 25 having remote control valves 26, 27, and 28 coupled to the fluid lines 29, 30 and 31, respectively. The fluid line 29 is connected through pump 32 to the pressurized container 33, schematically illustrated, while the fluid line 31 is connected through pump 34 to the pressurized liquid container 35. The fluid line 30 is connected through pump 36 to container 37.

The foam gun 20 may be of any desired construction, so long as it has inlet passage for receiving the various liquid and fluid elements to be mixed, and so long as it has the preexpander chamber 21 in which the elements are mixed and the foaming reaction occurs.

Mounted in fluid or feed line 29 is a variable-pressure relief valve 39 adjacent to but upstream of the header 25. The variable-pressure relief valve 39 is adapted to restrict and control the pressure and flow of liquid in the feed line 29. The relief valve 39 may be of a construction such as that disclosed in FIG. 3. Relief valve 39 includes a block or housing 40 having an inlet passage or channel 41 connected in fluid communication with the feed line 29. Liquid passing through the inlet channel 41 discharges through port 49 into a space or cavity 42 on one side of a flexible diaphragm 43. An exit channel or passage 44 is also formed in the block 40 and communicates with the same cavity 42 on the same side of the flexible diaphragm 43 through port 50. The exit passage 44 is coupled in fluid communication with the section of the feed line 29 leading to the header 25.

On the opposite side of the flexible diaphragm 43 is a pressure chamber 45 communicating with a fluid column or line 46. The fluid line 46 extends above ground and passes through a fluid regulator 47 to a variable source of pressurized fluid, such as nitrogen, in reservoir 48.

Thus, by controlling the regulator 47 the pressure in the chamber 45 in the relief valve 39 may be varied according to the force or pressure applied to the fluid, such as nitrogen, in the column or conduit 46. When the pressure in chamber 45 exceeds the pressure in chamber 42, the flexible diaphragm 43 will be forced toward the ports 49 and 50, thereby restricting the flow of liquid between the two passages 41 and 44. When the pressure in chamber 45 is less than the pressure in chamber 42, then the flexible diaphragm 43 will be expanded away from the ports 49 and 50 to permit greater flow of liquid between the two passages 41 and 44.

A pressure relief valve 51, identical to the pressure relief valve 39, is installed in the fluid or feed line 31. The pressure against the diaphragm within the relief valve 51 is likewise controlled through a fluid column 52 passing upward above the ground to the fluid source 48, and which may likewise be controlled, independently of the line 46, through the regulator 47.

In the preferred form of the invention, pressurized fluorocarbon gas supply containers or reservoirs 53 and 54 are connected to the respective feed lines 29 and 31 through valves 55 and 56. The valves 55 and 56 are normally closed during the grouting process, as illustrated by valve 55 in FIG. 4.

In the illustrated apparatus of FIG. 1, a liquid organic isocyanate and pressurized liquid fluorocarbon are pre-blended and introduced into the container 33. Sufficient pressure is maintained in the container 33 to keep the pressurized fluorocarbon in a liquid state.

In a similar manner, a liquid polyol and a pressurized liquid fluorocarbon are pre-blended and introduced into the container 35, where sufficient pressure is maintained within the container 35 to keep the fluorocarbon in a liquid state.

The container 37 merely contains a solvent, such as methylene chloride, for flushing the foam gun 20 at the completion of the foaming reaction and after the foam material has been discharged through the nozzle 22.

The liquid isocyanate is an organic polyisocyanate referred to as a "prepolymer". Examples of such polyisocyanates are tolylene, diisocyanate or methyl diphenyl diisocyanate.

The liquid polyol within the container 35 may be a polyhydroxy compound, such as one of the polyhydroxy ethers, such as alpha methyl glucoside or pentaeriothol.

The ratio of the polyisocyanate and the polyol may be 60–55 percent isocyanate to 40–55 percent polyol, although even these proportions can vary depending upon the conditions under which the foaming materials are discharged into the voids, and the particular variety of ingredients being injected. The chemical equivalent ratio between the prepolymer and the polyol cannot be less than 1.05 NCO content to 1.0 OH or hydroxyl number, for useful structural strength of the set foamed material for filling the voids.

Figure 4:
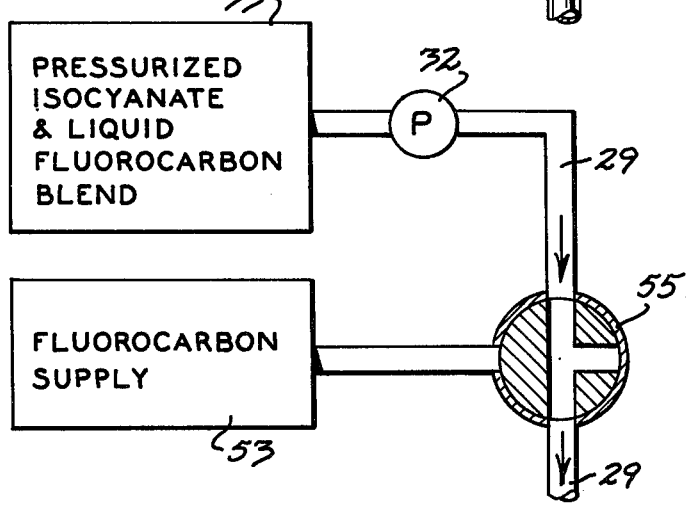
FIG. 4 is an enlarged schematic view of the valve for introducing fluorocarbon into a feed line, in closed position.

With all of the equipment in position substantially as disclosed in FIG. 1, and a previously described, the valves 55 and 56 are closed as disclosed in FIG. 4.

The pumps 32 and 34 are started to pump metered amounts of the respective, blended, foam-forming ingredients through their respective feed lines 29 and 31. The relief valves 39 and 51 are preset, preferably in a mode of high restriction of the flow of blended liquids through the valves 39 and 51 to the header 25, without closing the relief valves. The purpose of the high restrictive setting of relief valves 39 and 51 is lines 29 and 31 under sufficient, as well as uniform, pressure, to keep the pre-blended, foam-forming ingredients and the pressurized fluorocarbon in liquid form. During the feeding of the pre-blended foam-forming ingredients and the fluorocarbon liquefied gas from their respective reservoirs 33 and 35 to the header 25, the fluorocarbon must be maintained in liquid form so that it will not "boil off" prematurely. The maintenance of the fluorocarbon in liquid form becomes of more concern the longer the feed lines 29 and 31, particularly at great depth, where the pre-blended ingredients are so much under the influence of gravity while moving downward through the vertical conduits 20 and 31. Accordingly, it is also important that the relief valves 39 and 51 be located as close to the header 25 and expansion chamber 21, as possible.

With the variable pressure relief valves 39 and 51 initially regulated and the pumps 32 and 34 started, the valves 26 and 28 are opened to permit the pre-blended liquids to discharge through the header 25 into the expansion chamber 21 from the pressure relief valves 39 and 51.

As the feeding process continues, constant adjustments must be made at the ground level through the regulator 47 in order to independently adjust the pressures of the liquids upstream of the respective pressure relief valves 39 and 51.

Since the isocyanate has different properties from the polyol, such properties will manifest themselves as the respective foam-forming ingredients flow through the feed lines 29 and 31. The isocyanates and the polyol have different viscosities as well as specific gravities. Accordingly, the pressures applied through the relief valves 39 and 51 must be remotely and independently controlled to accommodate the different characteristics of the two materials flowing through the lines 29 and 31. Moreover, the viscosities of the two materials will vary according to the temperatures which they encounter, which in turn will also vary according to the environment encountered through the different depths through which the materials are moving in their respective feed lines 29 and 31. The polyol and isocyanate progressively resist remaining in their liquid states at higher temperatures, even under equal confining pressures.

The pressures will have to be varied in the relief valves 39 and 51 to accommodate the differences in viscosity and density of the two-foaming ingredients, as well as the static heads of the two ingredients, depending upon the depth to which the feed lines 29 and 31 extend. Line pressures must also be varied in order to accommodate the varying degrees of drag or friction between the foam-forming ingredients and the walls of the feed conduits or lines 29 and 31, which drag also varies as the viscosity of the materials vary.

Thus, the flow pressures within the feed lines 29 and 31 must be continually monitored by remotely controlling the relief valves 39 and 51 through the regulator 47 from the ground level, so that both pre-blended, foam-forming ingredients will arrive not only in liquid form, but also in the desired feed ratio for mixing with each other in the expansion chamber 21.

Without the variable pressure relief valves 39 and 51, the only control over the feeding of the pre-blended, foam-forming ingredients would be through their respective pumps 32 and 34. Since the pumps 32 and 34 are located at the ground station, and the valves 26 and 28 are wide open in the feeding mode, the foam-forming ingredients, as well as the fluorocarbon expanding agents, are freely subject to the laws of gravity and line friction, as well as to their inherent viscosity and density characteristics. In actual experiments without the relief valves 39 and 51, the fluorocarbon expanding agent tends to change from its liquid form to a gas in the feed lines 29 and 31, well before the ingredients are introduced into the expansion chamber 21, causing deleterious premature boiling off of the expanding agents before they can properly perform their desired function of creating the closed-wall bubbles in the froth foam material 60. Without the relief valves 39 and 51, the material discharging from the nozzle 22 is an incompletely foamed slush material having none of the desired characteristics required for filling, sealing and solidifying within the voids 13 and 14.

When the pre-blended, foam-forming ingredients are permitted to fall by gravity through the respective feed lines 29 and 31, without the benefit of a variable pressure relier valve, the prematurely boiling fluorocarbon gas increases not only its own volume, but also the volume of the isocyanate or polyol. Thus, instead of a controlled, pressurized, pre-blended liquid discharging from the variable control valves into the header 25, there is a pre-formed froth of considerably different formulation from that necessary to mix with the other pre-blended foam-forming ingredients in the expansion chamber 21.

Thus, with the incorporation of the relief valves 39 and 51 in the feed lines 29 and 31, the foam-forming ingredients, as well as the expanding agents, are maintained under constantly monitored control from the time they leave their respective reservoir containers 33 and 35 until they are delivered through the mixer head 25 to the expansion chamber 21.

Figure 3:
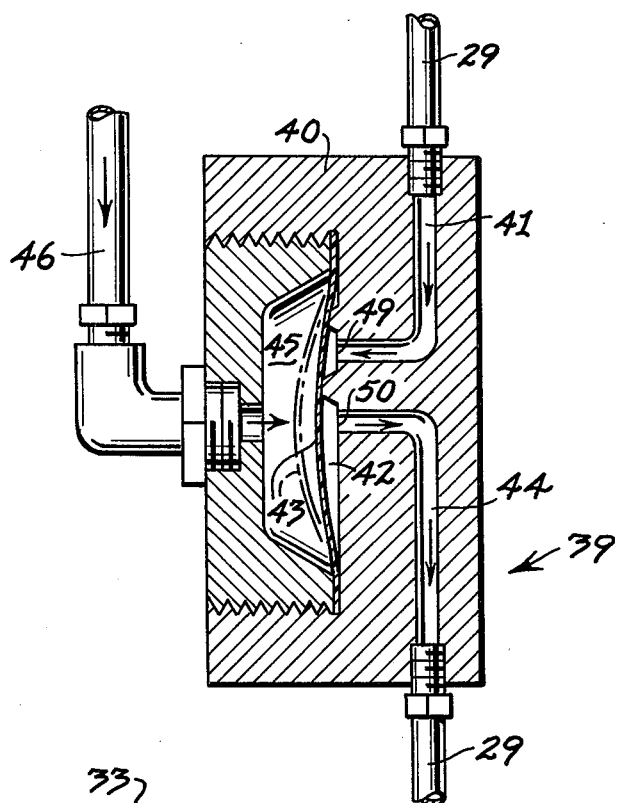
FIG. 3 is an enlarged sectional view of one of the remote controlled variable pressure valves in one of the feed lines.

It will be understood that other types of valves or metering devices may be used instead of the particular form of the variable pressure relief valves 39 and 51 disclosed in FIGS. 1 and 3.

In practice, the resisting or restrictive forces of the relief valves are maintained as high as possible without slowing down the flow of the liquid pre-blended ingredients at the desired rates.

The pressurized ingredients passing from the valves 39 and 51 through the header 25 are fed into the expansion chamber 21 under reduced pressure, permitting the liquefied fluorocarbon gas to expand within the cell walls formed by the reaction of the polyisocyanate and the polyol, to form a fluid, closed-cell, polyurethane froth foam material. Thus, the reaction of the isocyanate and the polyol commences within the expander chamber 21 and is well under way as it leaves the nozzle 22 and is discharged into the drilled hole 17 and into the openings of the voids 13 and 14. As the foamed products of reaction travel from the nozzle 22 through the drilled hole 17 and through the voids 13 and 14, until they substantially fill the voids, or fill the desired sections of the voids, they must remain in a fluid state, sufficient to flow, but not to set or gel.

The gel time of the reaction foam products is controlled by a cayalyst, which is generally introduced into the container 35 with the polyol blend, and fed with the polyol blend into the foam gun 20. This catalyst may be one of the tertiary amines or themetallic salt of an organic acid. Examples of the teritary amine catalyst are the trimethylamines, such as trimethyl butyl diamine or trimethyl ethyl diamine. An example of one of the metallic salts is stannous octoate. The amount or nature of the particular catalyst may be varied according to the desired reaction time. The desired reaction, set or gel time will depend upon the length of time required for the foamed material to reach its destination within the respective voids. Such travel or flow time or distance is affected by many factors, such as the hydrostatic pressure of any water which may be in the voids, the pressure exerted by the pumps 32 and 34, the density and viscosity of the foamed material, and the size, length, and degree of continuity of the voids.

Also, the mixture within the pre-expander chamber 21 may include organo-silicone block copolymers preferably used as surface active agents to assure the production of closed cells and to assist in making compatible the isocyanates and the polyols. The foam material 38 discharged from the nozzle 22 must include closed cells which are not interconnected so that the material is impermeable to the passage of water.

The formulation of the foam-forming ingredients, that is the isocyanate and polyol, is such that the foam material 60, while it is still reacting and in the fluid state is not contaminated by the underground water, and particularly by the impurities, such as the minerals of chemical elements carried by the water. Moreover, the nature of the material selected, that is the nature of the isocyanates and polyols, is such that the foam material 60 is inert chemically and physically to reaction with the water or the impurities carried by the water.

The vapor pressure of the bubbles created within the foam material 60, as well as the pressure applied to the materials to discharge them from the nozzle 22, are such that the pressure of the foam material 60 is greater than the water, either static of flowing, in the voids, so that the foam material 60 will displace the water completely from the voids 13 and 14.

The foam-forming ingredients must be of a type to produce a foam material capable of adhering to the walls of the voids 13 and 14, so that the foam material will be "locked" in the voids, particularly after the foam or froth has gelled or set.

In lieu of the pumps 32 and 34, the tanks or containers 33 and 35 may be pressurized with nitrogen at a pressure, for example of 250 psi., to effect the pumping action necessary to force the foam material 60 from the discharge nozzle 22.

It will be understood that other types of foam-forming ingredients as well as expanding agents may be used, so long as they produce the above-described results.

For application of the method at deeper or lower levels of voids, a higher percentage of fluorocarbon gas, or even carbon dioxide, relative to the isocyanate and polyol, is employed in order to overcome the higher hydrostatic pressures at the deeper levels. Moreover, the type and quantity of fluorocarbon gas used is dictated by the desire capacity of the expanding mixture to hold as much of the gas as possible and to release only minimum quantities.

Since the foam material 60 tends to rise because of the bubbles it contains, it is desirable, although not mandatory, to place the foam gun 20 as close to the opening of the fissure or void as possible. It the opening is a large one, then successive layers of the foam may be discharged by gradually moving the gun 20 down in a step-by-step procedure.

It has been found in carrying out the grouting process in accordance with this invention that sometimes air is trapped in the feed lines 29 and 31 adjacent the upstream sides of the pressure relief valves 39 and 51.

In previous tests in which air was used as an expanding agent, a poor quality of froth foam material was produced. As a matter of fact, such tests showed tht the froth foam did not have a closed-cell structure, and the qualities of the foam product required for the proper expansion, solidification and setting in extensive voids was not present in the froth foam product in which air was used as the expanding agent.

Furthermore, it has been found that such a large quantity of compressed air must be used to obtain a good mix with the foam-forming ingredients, that a very high exit velocity is developed at the mixing head. Such a high velocity of air will create great turbulence in the mixture of the foam with the subterranean water and will therefore result in a poor quality foam. If the amount of air is reduced, the mixture will also be reduced, still impairing the quality of the urethane foam. In all tests in which compressed air was used as mixing or expanding agent, the resulting foam product was so poor in quality that it could not be used for the extensive filling of voids as contemplated by applicant's method, such as for use in dam-bearing sites, or in mine sealing.

It is believed that the reason compressed air is such a poor mixing agent is that it contains approximately 79% nitrogen, which is poorly soluble into isocyanate and polyol foam-forming ingredients.

Figure 5:
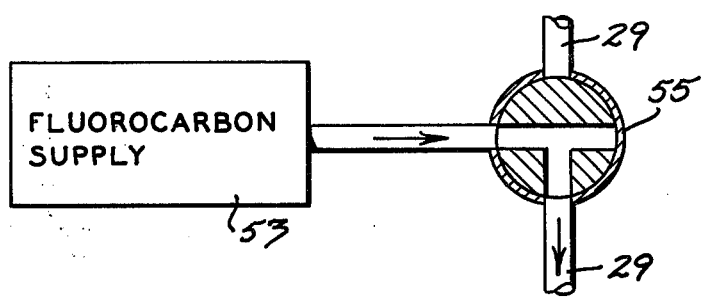
FIG. 5 is a view similar to FIG. 4, disclosing the valve in open position.

Accordingly, before a grouting process is initiated, and if the feed lines 29 and 31 are open and contain air, the lines 29 and 31 are first purged of the air. First, the relief valves 39 and 51 may be opened as wide as possible by reducing the pressure in the fluid columns 46 and 52. Then the valves 55 and 56 are opened, as disclosed in FIG. 5, to discharge a fluorocarbon gas from the reservoirs 53 and 54, through the lines 29 and 31, and out through the nozzle 22. After the lines are purged of air, only the fluorocarbon gas remains in the feed lines 29 and 31. The valves 26 and 28 are then closed, the valves 55 and 56 are turned to their closed positions in FIG. 4, and the grouting method is initiated, as previously described.

Because the fluorocarbon remaining in the closed lines 29 and 31 is in gaseous form, it is compressed into a liquid substantially reduced in volume by the pre-blended, compressed foam-forming ingredients and expanding agents pumped through the lines 29 and 31 from the reservoirs 33 and 35. Accordingly, because of the relatively insignificant volume of the added liquid fluorocarbon purging agents, such fluorocarbon will have little effect upon the predetermined ratio of the pre-blended fluorocarbon liquid and their respective foam-forming ingredients in the lines 29 and 31.

Of course, the purging step need not be repeated for every grouting process, but only when the lines 29 and 31 have been opened to the atmosphere.

Check valves 80 and 81 are preferably installed in the lines 29 and 31 between the respective relief valves 39 and 51 and the header 25 to prevent reverse flow of the ingredients into the relief valves 39 and 51.

Figure 2:
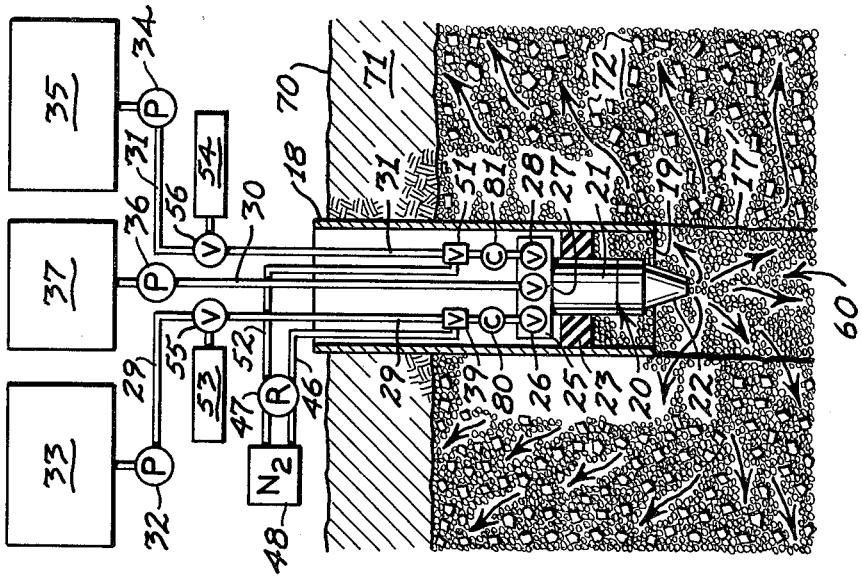
FIG. 2 is a sectional elevation similar to FIG. 1, illustrating a pervious gravel, ground formation.

FIG. 2 illustrates the same apparatus disclosed in FIG. 1, except that the foamed material 60 is applied to an earth formation having a ground level 70, soil stratum 71, and a large sub-strata of pervious gravel 72. The foam material 60 discharged into the drilled hole 17' of the pervious gravel 72 penetrates all of the minute voids constituting the spaces between the solid gravel particles and fills these voids in the same manner as the larger voids 13 and 14 in the bedrock 12 of FIG. 1. Because of the longer and more sinuous passage of the foam material 60 and because of the smaller cross-sections of the smaller voids, the formulation of the isocyanate, polyol and fluorocarbon gases may be changed, as well as the amount and nature of the catalyst, to lengthen the gel or set time. Formulation should probably also be changed to reduce the viscosity of the foam material 60. Otherwise, the method applied to the ground formation of FIG. 2 is essentially the same as that applied to the ground formation of FIG. 1. Moreover, the control of the flow of pressure in the feed lines 29 and 31 by the relief valves 39 and 51 is equally important in the process disclosed in FIG. 2, as it is in the process disclosed in FIG. 1.

What is claimed is:

1. A method of extensively filling voids in subterranean solid formations comprising:
   a. feeding a liquid, foam-forming ingredient, comprising an organic isocyanate, in a feed path from a ground surface station to a pre-expander chamber within the region adjacent a void to be filled,
   b. feeding a liquid, foam-forming ingredient, comprising a polyol, in a feed path from said ground surface station to said pre-expander chamber,
   c. feeding an expanding agent in the form of a liquefied fluorocarbon in a feed path from said ground surface station to said pre-expander chamber,
   d. feeding a reaction catalyst with one of said foam-forming ingredients to said pre-expander chamber, in an amount corresponding to the required length of set time for gelling the polyurethane foam material,
   e. variably maintaining the flow pressures of said foam-forming ingredients and said fluorocarbon throughout the feed paths of said foam-forming ingredients and said fluorocarbon, by remotely controlling valve means in said feed paths immediately adjacent and upstream of said pre-expander chamber, so that said foam-forming ingredients and said fluorocarbon are in a liquid state immediately prior to release from said valve means into said pre-expander chamber,
   f. mixing said liquid foam-forming ingredients and said fluorocarbon under reduced pressure in said pre-expander chamber so that said fluorocarbon expands as a gas within said mixed foam-forming ingredients to produce a fluid, pre-expanded, closed-cell polyurethane froth foam material, inert to reaction with subterranean water in said void, and pressure-resistant to the hydrostatic pressure of any water in said void,
   g. discharging said fluid, polyurethane froth foam material into said void with sufficient force to displace any water from said void, and to substantially fill said void within said set time, and
   h. permitting said polyurethane froth foam material to gel within said set time within said void and to adhere to the walls of said void.

2. The invention according to claim 1 further comprising the step of blending a first portion of said liquified fluorocarbon with said liquid isocyanate prior to the step of feeding both said isocyanate and said first blended portion of fluorocarbon to said pre-expander chamber, and further comprising the step of blending a second portion of said liquefied fluorocarbon with said liquid polyol prior to the step of feeding said polyol blended with said second portion of said fluorocarbon to said pre-expander chamber, said respective fluorocarbon portions being pre-blended with said isocyanate and said polyol in sufficient quantities to produce said fluid, pre-expanded, polyurethane froth foam material when mixed in said pre-expander chamber.

3. The invention according to claim 1 in which the ratio of said foam-forming ingredients is approximately 60–55 percent organic isocyanate to 40–55 percent polyol.

4. The invention according to claim 3 in which the chemical equivalent ratio of said organic isocyanate to said polyol is not less than 1.05 NCO content to 1.0 hydroxyl number.

5. The invention according to claim 1 further comprising the step of drilling a hole from ground level to intercept said void before said feeding steps, so that said region is in said hole and in communication with said void.

6. The invention according to claim 1 in which said step of variably maintaining the flow pressures comprises variably restricting the flow of said foam-forming ingredients and said fluorocarbon in said valve means.

7. The invention according to claim 6 in which said valve means comprises a pressure-responsive valve in said feed path, a fluid column in pressure-responsive communication with said valve and extending to said ground surface station, said step of remotely controlling said valve means comprising varying the pressure of the fluid in said fluid column from said ground station.

* * * * *